(12) United States Patent
Nicol et al.

(10) Patent No.: US 6,438,655 B1
(45) Date of Patent: Aug. 20, 2002

(54) METHOD AND MEMORY CACHE FOR CACHE LOCKING ON BANK-BY-BANK BASIS

(75) Inventors: Christopher John Nicol, Springwood N.S.W. (AU); Kanwar Jit Singh, Hazlet, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/437,271

(22) Filed: Nov. 10, 1999

Related U.S. Application Data
(60) Provisional application No. 60/130,216, filed on Apr. 20, 1999.

(51) Int. Cl.$^7$ ................................................ G06F 12/00
(52) U.S. Cl. .................... 711/136; 711/160; 365/230.03
(58) Field of Search .................................. 711/160, 136; 365/230.03

(56) References Cited

U.S. PATENT DOCUMENTS

| | | | | |
|---|---|---|---|---|
| 4,977,498 A | * | 12/1990 | Rastegar et al. | 711/128 |
| 5,182,809 A | * | 1/1993 | Begun et al. | 710/200 |
| 5,974,508 A | * | 10/1999 | Maheshwari | 711/133 |

* cited by examiner

Primary Examiner—Do Hyun Yoo
Assistant Examiner—Mehdi Namazi
(74) Attorney, Agent, or Firm—Gary D. Yacura

(57) ABSTRACT

A cache implements bank-by-bank locking to keep critical code from being flushed out of the cache. A register is maintained to rank the banks from the most recently used to the least recently used. Ordinarily, when code needs to be moved into the cache, the least recently used bank is flushed, the code is moved into that bank, and the register is updated to identify that bank as the most recently used. However, if a bank is designated in a bypass vector as being locked, that bank is bypassed in the maintenance of the register and is thus never identified as the bank to be flushed.

39 Claims, 4 Drawing Sheets

FIG. 4A

```
PROGRAM () {
    CODE FRAGMENT A1
    /*PRAGMA: CRITICAL BEGIN*/
    CODE FRAGMENT C1
    /*PRAGMA: CRITICAL END*/
    CODE FRAGMENT A2
    CODE FRAGMENT A3
    /*PRAGMA: CRITICAL BEGIN*/
    CODE FRAGMENT C2
    /*PRAGMA: CRITICAL END*/
    CODE FRAGMENT A4
}
```

FIG. 4B

```
PROGRAM () {
    LOCK_IN_CACHE(C1,C2);
    CODE FRAGMENT A1
    CODE FRAGMENT C1
    CODE FRAGMENT A2
    CODE FRAGMENT A3
    CODE FRAGMENT C2
    CODE FRAGMENT A4
    RELEASE_LOCKED_BANKS();
}
```

FIG. 4C

| BANK | 0 | 1 | 2 | 3 |
|---|---|---|---|---|
| | A1 | A2 | A3 | A4 |
| | C1 | | C2 | |

FIG. 4D

| BANK | 0 | 1 | 2 | 3 |
|---|---|---|---|---|
| | A1 | C2 | A2 | A4 |
| | C1 | A2 | A3 | |

FIG. 4E

| BANK | 0 | 1 |
|---|---|---|
| | C2 | A1 |
| | C1 | A2 |

METHOD AND MEMORY CACHE FOR CACHE LOCKING ON BANK-BY-BANK BASIS

REFERENCE TO RELATED APPLICATION

This application claims the benefit of U.S. Provisional Application No. 60/130,216, filed Apr. 20, 1999, whose disclosure is hereby incorporated in its entirety into the present disclosure.

BACKGROUND OF THE INVENTION

This invention relates to a method of cache locking on a bank-by-bank basis in a cache implementing a "least recently used" cache replacement scheme, and to a cache implementing such a method.

A popular type of cache is a set-associative cache, shown in FIG. 1. Cache 100 includes several cache banks 102, and each bank 102 has a TagRAM section 106, a StateRAM section 108, and a DataRAM section 104. Each cache bank has a number of addressable memory locations (typically, a power of 2), which are divided into a number of blocks. Illustratively in FIG. 1, the cache banks contain 16 memory locations each, each bank has 8 blocks, and each block corresponds to 2 of the cache bank's memory locations. TagRAM 106 locations (marked "T") store some of the more significant bits of a main memory address that corresponds to the information in the block's DataRam 104 (marked "D"), and the StateRAM 108 (marked "S") indicates whether the information in the associated cache block is valid. Illustratively, if a given cache bank address contains 128 bits, or four 32 bits words, and 2 cache addresses form a block, then each block contains eight 32 bit words. Storing 8 words in a block accounts for the three least significant bits of the main memory addresses. If the employed cache banks have 16 addresses and 2 cache addresses form a block, then the main memory can be divided into 8 sets of addresses, with addresses from each set being cached in designated blocks of the cache. This accounts for three more bits of the main memory addresses.

FIG. 1 includes three cache banks, which make cache 100 a 3-way set-associative cache. A CPU 300 that wishes to obtain information (instructions or data) provides an address to control module 200, and control module 200, in turn, provides the address to cache 100. In response to the received address, the cache determines whether information corresponding to the provided address is found in the cache (i.e. a match is found in the TagRam). If so, the cache raises the "hit" signal of line 111, places the identity of the bank where the hit occurred on line 112, and provides the retrieved information to control module 200. Control module 200 then provides the information to CPU 300.

Lines 111 and 112 are applied to replacement unit (RU) 150 which updates its information regarding the latest "hit" and provides a signal on line 113 to control module 200 to assist control module 200 in determining the bank into which new information should be written, if necessary.

When cache 100 determines that there is a "miss," that information is communicated to control module 200 via line 111, which causes control module 200 to issue a Stall command to CPU 300 and to issue a request for information to memory 500. This request is processed via memory interface circuitry 400. Information is responsively fetched from main memory 500, is provided to control module 200 (via unit 400), and control module 200 writes the information into cache 100. Concurrently, control module 200 can provide the fetched information to CPU 300. The writing to cache 100 is executed by control module 200, as indicated above, based on information provided to control module 200 by replacement unit 150 on line 113. While the information is stored in the DataRam of cache 100, the TagRAM and StateRAM are written to indicate that the corresponding address is now in cache and that the information is valid.

During a lookup of a set-associative partitioned cache, each cache-bank 102 selects one entry based on the sought address. The TagRAM for that entry is compared with the appropriate bits in the sought address, and if any of the comparisons match, a "hit" is declared, provided that StateRAM 108 for that entry indicates that the entry is valid.

Several schemes are known for determining the replacement bank. One is the least recently used (LRU) policy. Another one is the round robin replacement policy. Replacement unit (RU) 150 contains the hardware that determines the replacement bank, i.e., the bank into which information is written, and it uses the history of cache accesses to compute the replacement bank.

The least recently used (LRU) replacement policy uses the notion that the cache entry that has not been used for the longest time is the least likely to be used again. Consequently, it is a good choice to be replaced and is so designated. Since the access patterns differ on different lines, there is a separate LRU bank computed for each cache line. In order to keep track of the LRU index for each line, a history of accesses must be maintained.

In order to improve the performance of programs, a technique called "cache locking" has been proposed. Frequently used instructions or time-critical program segments are locked in the cache. That avoids the penalty of a cache-miss when the program references those instructions. Conversely, by locking some parts of the cache, the cache size available to non-critical program segments is reduced, which can slow them. That tradeoff must be studied for particular intended uses of the cache in order to determine whether locking is advantageous.

Several techniques have been proposed to accomplish Cache Locking. U.S. Pat. No. 5,353,425 describes an approach that implements a pseudo LRU by using a set of bits, called the MRU (Most Recently Used) bits, for each direct-mapped address. When an entry is loaded in cache, the corresponding MRU bit is set. The replacement Unit finds a bank that does not have the MRU bit set and uses it as the Replacement Bank. If all the bits are set then it is a deadlock condition since there is no place for the incoming cache-line to be stored. The replacement Unit determines this and resets all the MRU bits except the last one to be loaded. This erases the history of accesses and for this reason it is called a Pseudo LRU scheme. However, by providing an additional bit (called a LOCK bit) for every MRU bit, that technique has the ability to implement cache locking. The LOCK bits are combined with the MRU bits to ensure that the locked line is never selected for replacement. When the cache-line is no longer going to be frequently accessed, the corresponding LOCK bit can be reset, which allows the cache-line to participate in the replacement.

U.S. Pat. No. 5,493,667 describes an arrangement with a true LRU replacement policy. The replacement computation uses a store of bank identifiers for each cache line. That memory uses the history of accesses and orders the banks according to the time since their last use. The technique works as follows. The cache bank that is the most recently used (MRU) is inserted into the right-most column of the memory. All the entries are shifted to the left, stopping at the entry that matches the current MRU index. This shifting operation results in the left-most entry being the least recently used (LRU) bank. When the cache misses, that LRU entry points to the bank that will receive the incoming instructions. When these instructions are loaded into the cache, this LRU index becomes the MRU and is inserted into the right-most column, resulting in a shift of the entries and a new LRU index being computed for the cache line. In order to perform cache locking, a lock signal is asserted. When that signal is asserted, the MRU index is inserted not into the right-most column, but inserted into the column on its left. That causes the cache bank indexed with the right-most column to be always resident in cache. One may view the locking as treating the right-most column as fixed and the remaining N-1 columns as an N-1 way set-associative cache as long as the lock signal is asserted.

In order to use that technique, it is envisioned that the lock signal is not asserted during the first-pass of the time-critical program segment. That causes the critical code to be loaded into the cache and the right-most column of the LRU storing the location of that code fragment. During subsequent iterations of the critical program segment, the lock signal is asserted, which results in the critical code being cache resident. When no longer required, the lock signal is de-asserted, and the critical code can eventually be replaced as per the LRU policy.

A drawback of the arrangement described by the U.S. Pat. No. 5,493,667 patent is that only one cache bank can be locked at any time. That limits the amount of locked instructions to the size of a one-cache bank. In fact, the limit is more stringent in that only I-cache line is that maps to the same direct-mapped address can be locked. If several critical portions of code need to be locked, one has to ensure that they do not overlap, and no satisfactory method for achieving that is given. Also, since the lock signal is asserted and later de-asserted, it is important that the locking of the second-code segment not remove some of the locked code from the first segment. Another limitation appears when the critical code is already in cache and not in the right-most column. This can happen when the address of the critical code is near some previously executed code. The critical code may already be in cache when the locking commences. In such an event, the critical code will not be fetched from external memory, and it will not be in the right-most column. Thus, setting the lock bit will not guarantee that the critical code is resident.

SUMMARY OF THE INVENTION

Disadvantages of prior art arrangements are overcome, and an advance in the art is achieved by the use of a bypass register to modify the LRU computation. The bypass register has a number of entries that is equal to the number of banks in cache 100. The LRU computation places the MRU entry into the right-most column that is not locked. The entries are then shifted left, skipping over bypassed banks. The result is that the left-most non-locked entry is the LRU bank.

One may appreciate that if a cache bank in the bypass register is not shifted to the left while other entries are shifted to the left, then the bypassed column is assured of not becoming the bank in left-most column and, hence, not becoming the LRU bank.

The present invention enables the programmer to lock (and unlock) any cache bank at any time. Furthermore, the present invention allows programmers to lock multiple cache banks at the same time. Therefore, the present invention allows programmers to lock subroutines that do not fit into a single cache bank by locking the subroutines into more than one bank. It also enables programmers to lock multiple routines into a single bank.

BRIEF DESCRIPTION OF THE DRAWINGS

FIG. 4A shows source code written to take advantage of the present invention;

FIG. 4B shows an organization of object code compiled from the source code of FIG. 4A; and FIGS. 4C–4E show various arrangements of critical code segments from the object code of FIG. 4B in the cache.

DETAILED DESCRIPTION

Figure 1:
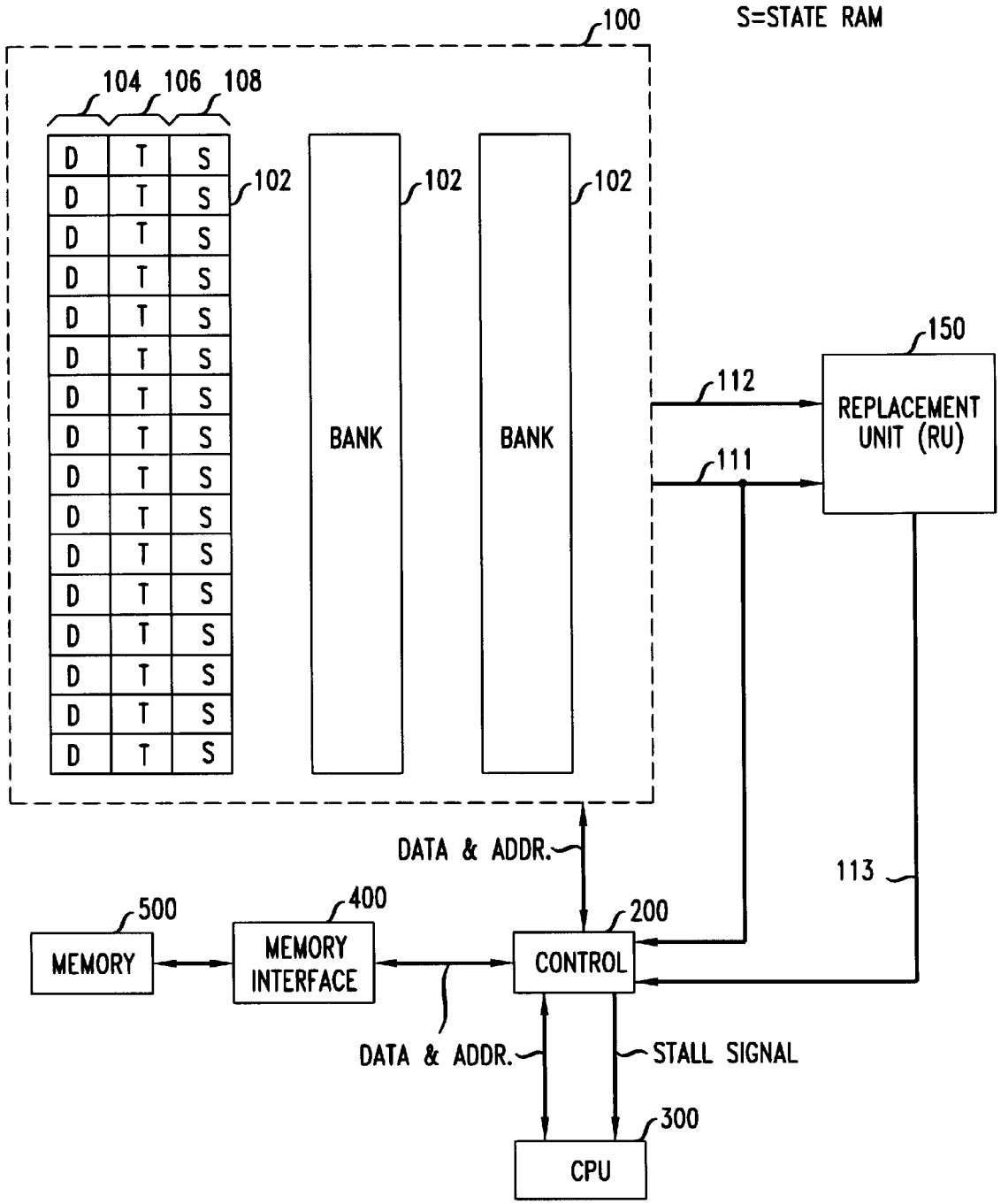
FIG. 1 shows a conventional cache arrangement.
Figure 2:
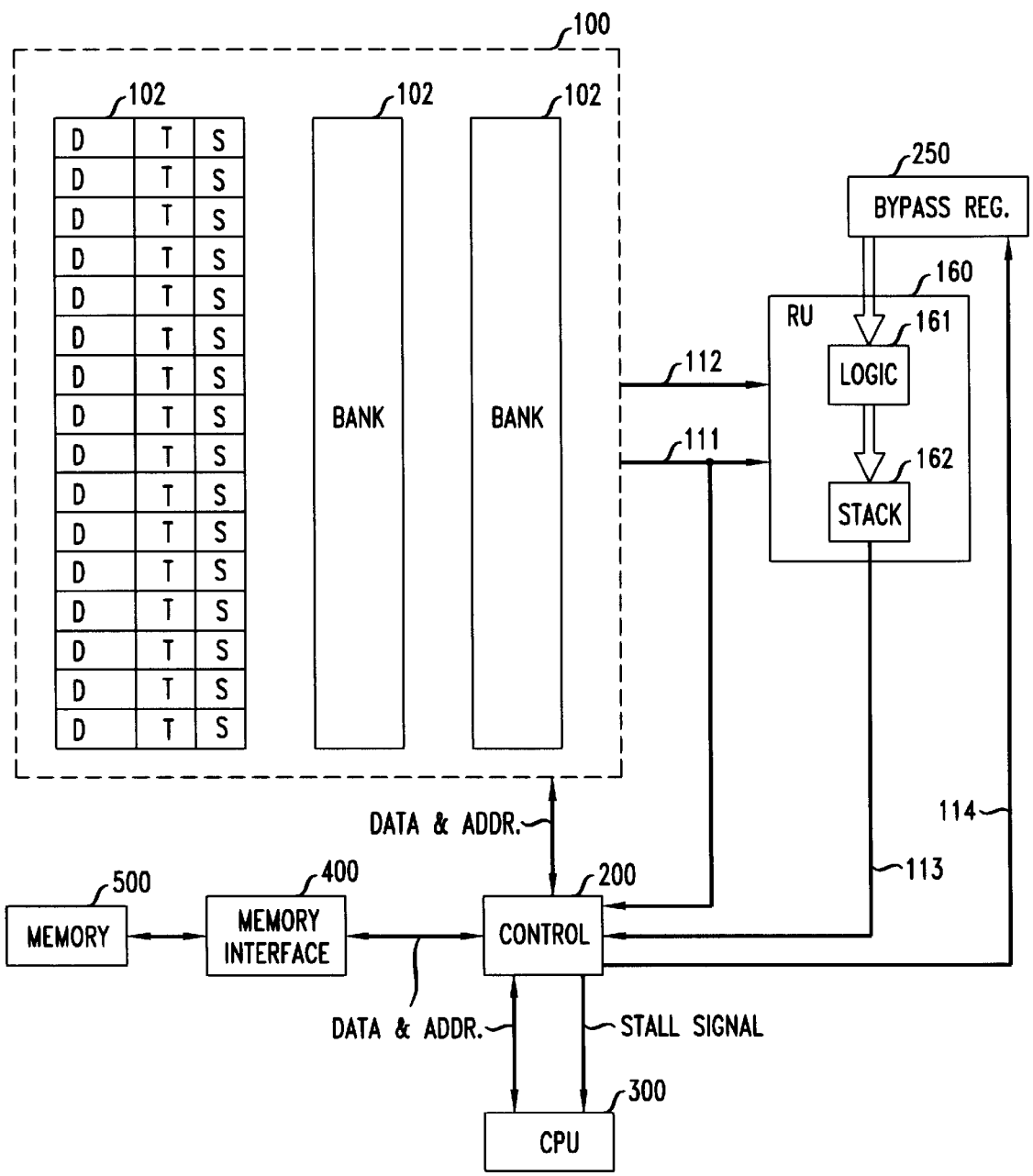
FIG. 2 shows a cache arrangement that is modified in accordance with the principles disclosed herein to permit locking any bank(s) of the cache.

In accordance with the principles disclosed herein, cache locking is achieved through the use of a bypass register and a unique, though simple, LRU computation. FIG. 2 presents a block diagram of an illustrative embodiment for an enhanced version of the FIG. 1 arrangement. It includes a bypass register 250 that is coupled to control 200, and a replacement unit 160 that is a modified version of replacement unit 150 of FIG. 1. Unit 160 includes a stack register 162 and logic circuitry 161 for carrying out the logic described in detail below. Logic circuitry 161 is responsive to bypass register 250 and to the signals on lines 111 and 112. The output of unit 160 of FIG. 2 is derived from the left-most location of stack register 162. Bypass register 250 has a number of entries equal to the number of banks in cache 100. Those entries are populated in response to programmer specification via line 114. More specifically, a programmer is given the ability to lock any chosen bank, or banks, by placing a flag (e.g., logic "1") in the appropriate location in bypass memory 250. Logic circuitry 162 uses the bypass memory 250 information to bypass the locked cache locations in LRU stack 162.

When no banks are locked, the LRU computation comprises shifting all locations in stack 162 to the left by one entry, and placing the MRU entry into the emptied right-most location. The bank identified in the left-most location in the stack is the least recently used bank (LRU) that is chosen as the replacement bank. When a cache bank is locked, the same process takes place, except that the shift to the left in the LRU stack lo bypasses, or skips, the locked locations, the MRU is placed in the right-most location that is not locked, and the LRU is identified by the contents of the left-most location that is not locked.

Table 1 illustrates the process with two situations: one where there are no banks locked, and another where the first bank and the fifth bank in a five-bank cache are locked.

TABLE 1

| Event | No locking Bypass Register: 00000 | | 2 banks locked Bypass Register: 10001 | |
|---|---|---|---|---|
| | stack content | LRU (col. 1) | Stack content | LRU (col. 2) |
| Reset | 12345 | 1 | 12345 | 2 |
| Cache Miss | 23451 | 2 | 13425 | 3 |

TABLE 1-continued

| | No locking<br>Bypass Register: 00000 | | 2 banks locked<br>Bypass Register: 10001 | |
|---|---|---|---|---|
| Event | stack content | LRU<br>(col. 1) | Stack content | LRU (col. 2) |
| Cache Miss | 34512 | 3 | 14235 | 4 |
| Hit @ bank 2 | 34512 | 3 | 14325 | 4 |
| Cache Miss: | 45123 | 4 | 13245 | 3 |
| Hit @ bank 3 | 45123 | 4 | 12435 | 2 |
| Cache Miss | 51234 | 5 | 14325 | 2 |
| Hit @ bank 2 | 51342 | 5 | 14325 | 4 |
| Hit @ bank 1 | 53421 | 5 | 14325 | 4 |

In the "no locking" section of the table, the bypass vector (derived from the lock bits) is set to all 0's, which indicates that no bank is bypassed. In that case, all the stack locations participate in the LRU mechanism. In the "2 banks locked" section of the table, only the location 2, 3, and 4 in the stack participate in the LRU update. Those banks correspond to a "0" in the bypass vector.

Going through some of the events shown in Table 1, on reset, each location in the stack is assigned its column number. Thus, the left-most location contains the designation "1," the next one contains the designation "2," etc. With the first cache miss in the table, in the "no locking" situation new information is stored in location 1, all entries are shifted left, and the designation "1" is placed in the right-most entry. In the "2 banks locked" situation, the first bank is locked and, therefore, information is written into location 2. Entries of locations 2, 3, and 4 are shifted to the left, but location 5 is not shifted to the left because it is locked. The location that was just written to, location 2, is then placed in the most recently used non-locked location, which is location 4. This results in the pattern 13425.

When a cache access generates a cache hit, the bank that sources the information becomes the MRU entry and it is moved to the right-most location. All entries to the left of it need not be moved, and only the entries to the right of it need to be shifted left. This is shown in the change from line 7 to line 8 of the "no locking" arrangement of table 1, where the hit was at bank 2. In the pattern 51234, the "5" and "1" entries to the left of the "2" are not touched, the "2" is removed, the "3" and "4" are shifted to the left, and the "2" is placed in the right most location.

When a cache access generates a cache hit in a bank that is locked, as illustrated in the last line of table 1, no change needs to occur in the usage pattern of the remaining banks. Accordingly, the pattern 14325 in the register content in the last line of table 1 of the "2 banks locked" arrangement is the same as that of the previous line of table 1. This combinatorial logic is easily implemented within logic block 161.

The above discloses improving a simple conventional cache to allow locking of any bank. U.S. patent application Ser. No. 09/187,866, filed Nov. 6, 1998, titled "Application-Reconfigurable Split Cache Memory," discloses an arrangement where small fast memories can be arranged to form a reconfigurable memory that can serve all four of the above functions. It is noted that the principles of this invention apply to reconfigurable arrangements such as the one disclosed in the aforementioned patent application and, therefore, the disclosure in the U.S. Ser. No. 09/187,866 application is hereby incorporated by reference.

Figure 3:
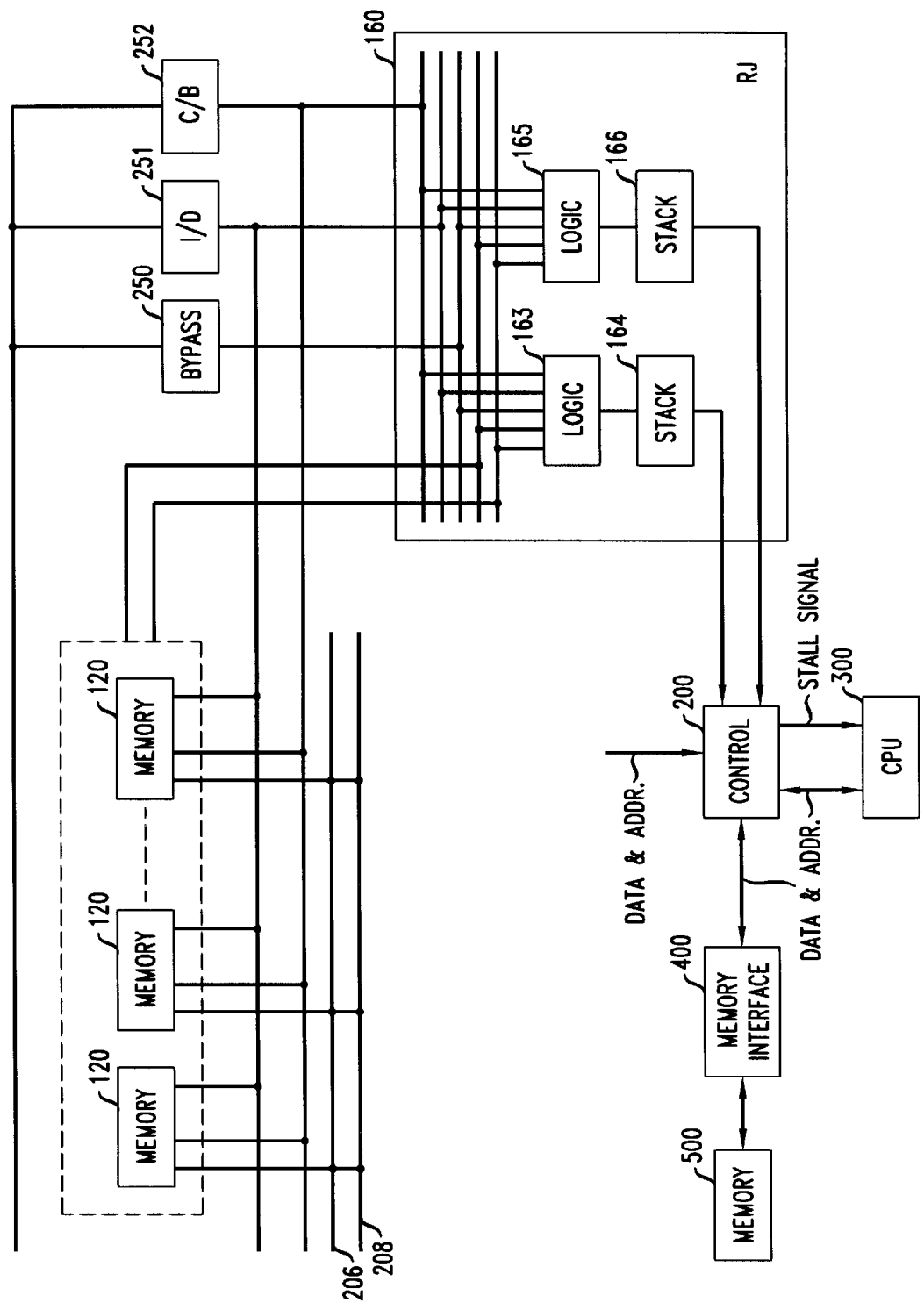
FIG. 3 shows a reconfigurable local memory system that permits locking any bank(s) of the local memory.

FIG. 3 shows how the principles disclosed herein are applied to a configurable arrangement. In FIG. 3, local memory is constructed from a plurality of memories 120 (banks) that are connected to a processor with separate instruction and data buses (like the SPARC processor). Each bank 120 is connected to a system bus 204 and to instruction bus 206 or data bus 208. Also, each bank is configured either as a cache (participates in a cache access on the appropriate bus) or as an explicitly addressable buffer. The configuration of each bank is controlled by appropriate switches within each of the banks, which are controlled by two bits, an "Inst" bit and a "Cached" bit, as shown in Table 2. These bits are stored in configuration registers 251 and 252, which can be read and written under program control, thereby allowing programmers to configure the local memory. The "Inst" control bit specifies the banks which are connected to the instruction bus. The other banks are connected to the data bus. The "Cached" control bit specifies which banks are cached. The other banks are explicitly addressed buffers. Each of the buses (206, 208) has a data line and an address line.

TABLE 2

| Inst | Cached | Behavior |
|---|---|---|
| 1 | 1 | Instruction Cache |
| 1 | 0 | Explicitly addressed Instruction Buffer |
| 0 | 1 | Data Cache |
| 0 | 0 | Explicitly addressed Data Buffer |

If the banks of the cache memory that are devoted to Data cache are considered to be separate from the banks of the cache memory that are devoted to the Data cache, then there needs to be a separate LRU determination for the two caches. This is achieved by appropriately combining the information in register 250 with the information in registers 251 and 252 in logic units 163 and 165 that control a instruction LRU stack 164 and an data LRU stack 166. Other than the logic described below, logic units 163 and 165 operate in a manner that is identical to that of logic circuitry 161. If the banks of cache memory that are devoted to Data cache are considered to be separate from the banks of cache memory that are devoted to Data cache, then there needs to Logic unit 163 forms an effective I-bypass register by I-bypass=(NOT (Inst AND Cached)) OR Lock.

I-bypass takes on the logic value "1" unless the "Inst" and "Cached" bits are "1" (i.e., the bank is an Inst cache) and the lock bit of register 250 is "0." Logic unit 165 forms an effective D-bypass register by D-bypass=Inst OR NOT Cached OR Lock. D-bypass takes on the logic value "1" unless the "Inst" bit is "0", the "Cached" bit is "1" (i.e., the bank is a Data cache) and the lock bit of register 250 is "0."

The following is one approach for populating and locking of cache banks:

1) A region of memory containing the instructions to be locked is identified. At the same time, one or more banks (with enough storage for all the locked instructions) are identified for locking.
2) The banks to be locked are turned into data buffers by setting the appropriate bits in the "Inst" and "Cached" control words. The "Inst=0" and "Cached=0" settings are used for those banks, designating them as a data buffer which can be explicitly addressed. Since those are buffers, they are bypassed from the LRU computation and do not participate in instruction caching.
3) The data is moved from memory into the banks designated for locking. That can be done either as explicit load and store instructions or a direct memory access (DMA) transfer. The DataRAM in the designated banks is loaded. The appropriate value is loaded in the TagRAM and StateRAM consistent with the address of the instructions in external memory.

4) The "Lock" control word is written to set a "1" in the locations corresponding to the locked banks.

5) The "Inst" and "Cached" control words are updated to reflect the I-cache status of the newly loaded banks; that is, they are set to "Inst=1" and "Cached =1."

The instructions are now locked in cache, and the information stored in the locked banks is thus resident till the programmer wishes to discard it. At a later stage, when the locked instructions are no longer needed, the "lock" bit on the corresponding bank is reset. The bypass vector will no longer bypass a thus released bank, and the released bank will participate in the LRU update. Eventually, as part of the cache replacement, the locked data will be flushed out of the cache.

The cache-locking mechanism disclosed above is flexible. Variable amounts of data can be locked in the cache. Also, several sections of code can be locked in one or more banks. By explicitly managing the locking, the programmer can ensure that all the appropriate code is locked prior to its being needed.

It should be noted that the loading of the instructions, tag, and state information into the RAM blocks prior to flipping the "lock bit" can be carried out in several ways. It is not required that the bank to be locked be configured as a data buffer first.

An alternative may be to use a memory address to directly address the RAMS. The cache does not respond to addresses in this range. For example, one may use the highest address bit to indicate whether the memory-address should be interpreted via a cache lookup or should be used directly to access a particular location. One could then directly load the data to the RAMs even with the bank configured as instruction caches.

It should also be noted that he order of loads of the RAMS is important. The DataRAM must be loaded first, followed by the TAG and state RAM. If the StateRAM is loaded as valid before the others, incorrect data may be fetched.

By appropriate optimizations, the usefulness of the cache-locking mechanism can be maximized, and the programmer can be relieved from explicitly managing the locking. That is discussed next.

The software required to use the technique has two roles:

1) Minimize the number of banks required to lock the critical portions of the program. That is an optimization which is performed during the compilation and depends on the cache size of each bank.

2) Place the appropriate code into the program to achieve the cache locking. That involves the details of changing configurations, transferring of data, etc.

The user can use directives in the application code; pragma directives in the comments are a popular way of passing hints to the compiler; as shown in FIG. 4A. Then during compile time, the compiler can select the location of the code segments so that they occupy the minimum number of cache banks, a shown in FIG. 4B. Furthermore, the compiler can generate code to automatically use the appropriate mechanism to lock the code fragments into cache. That provides a seamless way for achieving efficient code as well as making the appropriate optimizations to exploit the specific way of cache locking. The software ideas can be applied to achieve seamless cache locking with the previous approaches as well. Clearly, the optimizations required and the instructions generated to lock the code segments have to be tailored to the specific technique.

The following example illustrates these concepts. FIGS. 4C–4E show the structure of an application program that we will use for this example.

In FIG. 4A, a program is shown with some directives which indicate the critical segments. Typically, those critical segments are executed multiple times and constitute the major portion of the program execution time. FIG. 4C shows the compiled code segments as they might appear in a cache. An ordinary compiler may choose to locate critical code segments C1 and C2 such that they occupy addresses that map to the same cache line. When critical segments C1 and C2 are to be locked, that overlap will result in two cache-banks being required, even though the combined space required by the two segments is less than one bank. The extra locked bank results in fewer banks being available in the set-associative cache, which results in degraded performance.

However, with proper optimizations, as shown in FIGS. 4B and 4D, code segments C1 and C2 can be relocated so that they have no overlap. They can therefore be co-located into a single cache bank, as illustrated in FIG. 4E, so that only one bank is required to lock the critical code fragments into cache. The bank in which that code is to be locked can be either fixed by the programmer or determined by the operating system. The compiler, in addition to the appropriate relocation to minimize the number of banks, also generates the calls to lock the code and release it when the program terminates. That is shown as the by the italicized code fragment in the beginning and the end of the code segment shown in FIG. 4B. The locking routine must load the critical routines into the cache bank before locking the bank. In a system with configurable cache memories, the cache memory can be first configured as a data memory and the sequences of instructions that make-up the critical portions of code "stored" into the data memory. Typically a direct memory access (DMA) transfer is used to rapidly fill the cache bank with the critical portions of code. Once the code is loaded into the bank, the bank configuration is changed to "instruction" and locked, as described above.

An additional issue has to be considered when performing cache locking in systems that run multiple programs. Different programs may need to use cache locking for better performance. Since the cache-banks that are locked are unavailable to other programs, one has to be careful. There is the danger of locking all banks or degrading the performance by not leaving enough unlocked banks. That can be avoided by having a memory resource manager in the operating system, which allocates banks for different programs. The resource manager can chose to lock only a part of the critical segments or not to perform any locking, if no banks are available for locking. In cases when locking is critical to the correct functionality (as when there are real-time constraints), the operating system can unlock some locked banks for another non-real-time program, degrading its performance. Then it uses the released banks to lock the code-segments for the real-time program. All that requires that the locking and unlocking processes be carried out using system calls supported by the operating system.

While a preferred embodiment has been set forth in detail, those skilled in the art will readily appreciate that other embodiments can be realized within the scope of the invention. For example, any suitable memory hardware can be used, as can any suitable technique for identifying the critical code segments. Therefore, the present invention should be construed as limited only by the appended claims. Also, in connection with the description of the LRU stack, terms such as left-most are used. Of course, that is merely illustrative and the stack can be constructed in any manner that the designer might choose.

We claim:

1. A method for managing a cache memory, said memory including a number of banks, and a least-recently-used (LRU) stack having a plurality of entries that identify an order in which the plurality of banks have been accessed and identify a least recently used bank from among the banks, the method comprising the steps of:
   (a) providing a bypass vector identifying which ones of said number of banks are locked and which ones are unlocked; and
   (b) when said cache memory is accessed, updating said LRU stack by revising only those entries in said LRU stack that are identified by said bypass vector as banks that are unlocked.

2. The method of claim 1 wherein said step of updating comprises identifying in said LRU stack the left-most location that is not locked as the location that identifies the least recently used bank (LRU location), and
   when there is no cache hit,
      collecting information found in said LRU location,
      shifting information that is found in each location of the LRU stack toward said LRU location, while skipping over locations that are marked as locked by said bypass vector, and
      storing information obtained in said step of collecting in a location of said LRU stack that is emptied by said step of shifting; and
   when there is a cache hit,
      identifying a bank of said cache memory that produced said cache hit,
      identifying a location is said LRU stack that references the bank identified in said step of identifying,
      shifting information that is found in each location of the LRU stack to the right of said location identifying is step of identifying a location, toward said LRU location, while skipping over locations that are marked as locked by said bypass vector, and
      storing bank information obtained in said step of identifying a bank in a location of said LRU stack that is emptied by said step of shifting.

3. The method of claim 1, wherein each of the banks comprises a plurality of cache lines.

4. The method of claim 3, wherein each of the banks comprises a data RAM section for storing information to be cached.

5. The method of claim 4, wherein each of the banks further comprises a tag RAM section for storing a portion of an address identifying the information stored in the data RAM.

6. The method of claim 5, wherein each of the banks further comprises a state RAM section for storing information identifying whether that cache line is valid.

7. The method of claim 1, wherein the cache is a set-associative cache.

8. The method of claim 1, wherein the bypass vector comprises a plurality of bits, each of the plurality of bits corresponding to one of the entries, and each of the plurality of bits having one of (i) a first state identifying a locked bank and (ii) a second state identifying a bank which is not locked.

9. The method of claim 1, wherein step (b) comprises:
   (i) producing a cache hit signal when a cache hit occurs;
   (ii) producing a bank ID signal when the cache hit that corresponds to the bank that produced the cache hit and said bank that produced the cache is one of the unlocked banks; and
   (iii) updating the least recently used stack based on said bank ID signal.

10. The method of claim 1, wherein step (b) comprises:
    (i) producing a cache hit signal when a cache hit occurs;
    (ii) producing a bank ID signal when the cache hit that corresponds to the bank that produced the cache hit; and
    (iii) updating the least recently used stack based on said bank ID signal.

11. The method of claim 1, wherein the cache is implemented in a memory in which the banks are configurable as cache banks or explicitly addressable buffer banks under control of a first configuration register.

12. The method of claim 11, wherein said first configurable register is loaded under program control.

13. The method of claim 11, wherein the banks are further configurable as instruction banks or data banks under control of a second configuration register, such that the banks are configurable as instruction cache banks, instruction explicitly addressable buffer banks, data cache banks or data explicitly addressable buffer banks.

14. The method of claim 13, wherein said second configurable register is loaded under program control.

15. The method of claim 13, wherein the locked banks are loaded and locked by:
    (i) identifying instructions to be locked;
    (ii) identifying banks with sufficient capacity to hold the instructions to be locked;
    (iii) setting the first and second configuration registers such that the banks identified in step (ii) are configured as data explicitly addressable buffer banks;
    (iv) writing the instructions identified in step (i) into the banks identified in step (ii);
    (v) setting the bypass vector to indicate that the banks identified in step (ii) are locked; and
    (vi) setting the first and second configuration registers such that the banks identified in step (ii) are configured as instruction cache banks.

16. The method of claim 13, wherein the locked banks are loaded and locked by:
    (i) identifying data to be locked;
    (ii) identifying banks with sufficient capacity to hold the data to be locked;
    (iii) setting the first and second configuration registers such that the banks identified in step (ii) are configured as data explicitly addressable buffer banks;
    (iv) writing the data identified in step (i) into the banks identified in step (ii);
    (v) setting the bypass vector to indicate that the banks identified in step (ii) are locked; and
    (vi) setting the first and second configuration registers such that the banks identified in step (ii) are configured as data cache banks.

17. The method of claim 13, wherein the bypass vector employed in step (a) is an augmented version of said bypass vector provided in step (a) in accordance with I-bypass =(NOT (Inst AND Cached)) OR Lock where I-bypass corresponds to the augmented bypass vector, Inst corresponds to the first configuration register, Cached corresponds to the second configuration register; and Lock corresponds to the bypass vector provided in step (a).

18. The method of claim 1, wherein the locked banks are loaded and locked by:

(i) writing a program such that instructions to be locked are identified;

(ii) identifying banks with sufficient capacity to hold the instructions to be locked; and (iii) writing the instructions identified in step (i) into the banks identified in step (ii).

19. The method of claim 18, further comprising the step of (iv) locking said banks identified in step (ii).

20. The method of claim 18, wherein step (ii) comprises identifying a minimum number of banks necessary to hold the instructions identified in step (i).

21. The method of claim 18, wherein step (i) comprises:

(A) writing source code in which each of the instructions to be locked is tagged; and (B) compiling the source code to form object code containing a command to lock the instructions identified in step (i) in the cache.

22. The method of claim 21, wherein each of the instructions to be locked is tagged by delineating said each of the instructions with pragma statements.

23. The method of claim 22, wherein the source code is compiled such that, in the object code, all of the instructions to be locked are contiguous.

24. The method of claim 18, wherein, when the program and additional programs need to make use of the cache concurrently, it is determined whether all of the instructions to be locked can be locked, and if not all of the instructions can be locked, fewer than all of the instructions are locked.

25. A cache memory comprising:

a plurality of banks;

a least-recently-used (LRU) stack having a plurality of entries identifying an order in which the plurality of banks have been accessed and thereby identifying a least recently used bank from among the banks;

a bypass register for storing a bypass vector identifying which of the plurality of banks are locked and allowing more than one of said plurality of banks to be identified as locked;

a logic unit for determining when the cache is accessed; and a replacement unit for updating, when the cache is accessed, the LRU stack by revising only at least some of the entries corresponding to the banks which are not locked, the entries corresponding to the banks which are locked being bypassed.

26. The cache memory of claim 25 wherein said logic unit identifies whether the cache access results in a cache hit or a cache miss and wherein said replacement unit performs a different update based on whether said logic unit indicates cache hit or a cache miss.

27. The cache memory of claim 25, wherein each of the banks comprises a plurality of cache lines.

28. The cache memory of claim 27, wherein each of the plurality of cache lines comprises a data RAM section for storing information to be cached.

29. The cache memory of claim 28, wherein each of the plurality of cache lines further comprises a tag RAM section for storing a portion of an address identifying the information stored in the data RAM.

30. The cache memory of claim 29, wherein each of the plurality of cache lines further comprises a state RAM section for storing information identifying whether that cache line is valid.

31. The cache memory of claim 25, wherein the cache is a set-associative cache.

32. The cache memory of claim 25, wherein the bypass vector comprises a plurality of bits, each of the plurality of bits corresponding to one of the entries, each of the plurality of bits having one of (i) a first state identifying a locked bank and (ii) a second state identifying a bank which is not locked.

33. The cache memory of claim 25, wherein:

said logic unit produces a cache hit signal when a cache hit occurs but only when the cache hit is in a bank which is not locked.

34. The cache memory of claim 25, further comprising a first configuration register that is coupled to said plurality of banks, where information is said first configuration register configures said banks as cache banks or as explicitly addressable buffer banks.

35. The cache memory of claim 34 wherein said first configuration register is further coupled to address and data buses to allow modifying contents of said first configuration register.

36. The cache memory of claim 34 wherein said first configuration register is further coupled to said replacement unit.

37. The memory cache of claim 34, further comprising a second configuration register that is coupled to said plurality of banks, where information is said second configuration register configures said banks as instruction banks or as data banks.

38. The cache memory of claim 37 wherein said second configuration register is further coupled to address and data buses to allow modifying contents of said first configuration register.

39. The cache memory of claim 37 wherein said second configuration register is further coupled to said replacement unit.

* * * * *